United States Patent [19]

Friedman

[11] Patent Number: 4,662,449
[45] Date of Patent: May 5, 1987

[54] METHOD FOR CONTROLLING BOTTOM WATER CONING IN A PRODUCING OIL WELL

[75] Inventor: Robert H. Friedman, Houston, Tex.

[73] Assignee: Texaco Inc., White Plains, N.Y.

[21] Appl. No.: 816,467

[22] Filed: Jan. 6, 1986

[51] Int. Cl.⁴ .......................................... E21B 33/138
[52] U.S. Cl. .................................. 166/295; 166/281; 166/300
[58] Field of Search ............... 166/281, 294, 295, 285, 166/292, 300

[56] References Cited

U.S. PATENT DOCUMENTS

| | | | |
|---|---|---|---|
| 3,749,174 | 7/1973 | Friedman | 166/294 |
| 3,811,508 | 5/1974 | Friedman | 166/294 |
| 3,865,189 | 2/1975 | Friedman | 166/294 |
| 3,866,684 | 2/1975 | Friedman | 166/294 |
| 3,866,685 | 2/1975 | Friedman | 166/294 |
| 3,876,438 | 4/1975 | Friedman et al. | 166/294 |
| 3,893,510 | 7/1975 | Elphingstone et al. | 166/295 |
| 4,275,788 | 6/1981 | Sweatman | 166/292 |
| 4,328,864 | 5/1982 | Friedman | 166/295 |
| 4,352,396 | 10/1982 | Friedman | 166/295 |
| 4,475,593 | 10/1984 | Friedman | 166/281 |

Primary Examiner—Stephen J. Novosad
Assistant Examiner—Bruce M. Kisliuk
Attorney, Agent, or Firm—Jack H. Park; Kenneth R. Priem

[57] ABSTRACT

Disclosed is a method of treating an oil well completed in an oil formation overlying and in contact with a water formation to form a barrier below the communications of the well to prevent water moving upward from the underlying water containing formation into the well.

An acid solution capable of extracting metal ions from the formation is prepared, having dissolved therein sufficient nonionic soluble solids such as sucrose or other sugar to raise the density of the acid solution to a value greater than the density of the aqueous fluid in the formation.

The weighted acid solution is injected through the well into the formation.

An acidified resin emulsion comprising a hydrocarbon resin, acidified water and acid stable surfactant, is formulated using a resin emulsion which is susceptible to demulsification on contact with polyvalent metal ions. Sufficient soluble nonionic solid material such as sucrose or other sugar is added to the emulsion to raise its density to a value greater than the density of the aqueous fluid in the underlying formation.

The acidified resin emulsion is injected into the formation whereupon the resin emulsion demulsifies in the formation below the perforations of the wellbore. Since the region contains extractable polyvalent metal ions, demulsification occurs to establish an area having greatly reduced permeability.

16 Claims, 4 Drawing Figures

OIL WATER INTERFACE PRIOR TO PRODUCTION

OIL WATER INTERFACE AFTER PRODUCTION

BARRIER FORMED
BY NON-DENSITY
CONTROLLED FLUID

ORIGINAL
OIL
WATER
CONTACT

BARRIER FORMED
BY CONTROLLED
DENSITY FLUID

METHOD FOR CONTROLLING BOTTOM WATER CONING IN A PRODUCING OIL WELL

FIELD OF THE INVENTION

This invention concerns a method for treating a well which is experiencing bottom water coning, in which the pressure gradient caused by production of oil from a formation overlying a water saturated formation causes the water to rise in the formation forming a cone shaped zone around the well, which results in production of ever increasing quantities of water and corresponding decreasing quantities of oil. More specifically, this invention concerns a method for injecting a treating fluid into a well which has already experienced the problem of bottom water coning by means of which an impermeable barrier is formed at a location below the perforations in the producing well which restrains the upward movement of water toward the well.

BACKGROUND OF THE INVENTION

Many oil formations are known to exist in which the oil or liquid petroleum occupies the pore spaces in the upper portion of a permeable formation, and the water occupies the pore spaces in the lower portion of the same or a contiguous permeable formation. Water encountered in such aquifers underlying oil containing formations is ordinarily brine, having a density greater than 1 and frequently in the range of from 1.01 to 1.3, whereas the density of oil is in the range of 0.8 depending on the composition of the particular crude oil. Many crude oils are known which have higher specific gravities, but almost invariably the specific gravity of petroleum encountered in subterranean formations is less than the density of brines ordinarily associated with the petroleum formations. It is common practice to drill a producing well into such an oil formation to a point near the bottom of the oil-saturated interval, then to plug off the bottom of the well and to establish perforations through the well casing into the oil saturated formation through which fluid petroleum may flow, which permits it to be pumped or otherwise transported to the surface of the earth. In many formations, a number of conditions coexist which results in the establishment of a phenomena known as bottom water coning, in which the oil-water interface rearranges itself from a previous essentially horizontal configuration into a cone rising along the walls of the oil well. This cone shaped water saturated interval is formed as a result of pressure differentials created in the formation, which causes water to rise into the previously oil saturated portion of the permeable formation despite the density difference between oil and water which would ordinarily maintain the water at a lower level. This problem is so acute that in some instances the water-oil ratio rises to a value so high that further production of oil from the well is not commercially feasible. If the well is shut in and the pressure differentials created in the formation during the period of fluid production are allowed to equalize, some levelling of the oil water interface occurs, although the problem quickly reoccurs when production of oil from the well is resumed.

Many methods have been proposed in the prior art for treating a well afflicted with bottom water coning so as to reduce or eliminate the tendency for water to rise along the walls of a producing well resulting in the production of an ever increasing fraction of water from the well. One method has been disclosed by the Applicant himself in U.S. Pat. No. 4,475,593, which discloses a method for profile control in subterranean formation structures by the formation of a barrier at some desired distance remote from the well bore. This unique process can be utilized to selectively exclude water from water producing intervals interspersed with the oil producing intervals, but it has not always been entirely satisfactory when used as a remedial method for treating a well experiencing bottom water coning. It is believed that the reason that the method has not always been entirely satisfactory when applied to a well experiencing bottom water coning is related to with the fact that the treating fluid injected into the formation in accordance with the method described in U.S. Pat. No. 4,475,593 has a density about equal to the density of the brine normally encountered in aquafers underlying oil saturated intervals, which forms the water cone around the producing well. Thus the injected treating fluid moves essentially horizontally out from the well and forms a "doughnut" shaped area around the well. Moreover, since the process of the method described in U.S. Pat. No. 4,475,593 is especially aimed at curing a problem of water production from water producing intervals interspersed with oil containing intervals, the process has been designed to favor forming the flow restraining barrier in the water saturated zone. Thus when the process is applied to a well experiencing bottom water coning, the barrier is formed essentially opposite the perforations of the well and in the zone which has been saturated with water or oil field brine as a consequence of coning phenomenon itself. If the treating fluid is displaced horizontally from the well perforations beyond the water cone zone, it is in an oil saturated interval and no reaction occurs to form the barrier.

Although many of the prior art methods proposed for treating wells afflicted with bottom water coning have been at least partly successful in some applications, the problem still remains one which is frequently encountered in the industry and produces serious economic consequences in certain formations including the necessity to abandon an otherwise productive oil well. Accordingly, there is a substantial unfulfilled need for a method which is especially suitable for treating wells in which the production of oil is declining and the production of water is increasing as a consequence of bottom water coning.

SUMMARY OF THE INVENTION

This invention provides methods for controlling the undesired flow of water or brine which underlies an oil saturated subterranean formation into an oil well, referred to as bottom water coning. Specifically, the invention provides a method for forming a disk or cone shaped water impermeable barrier in the formation adjacent to the production well, below the zone where bottom water coning was previously occurring, which prevents the upward flow of water or brine into the perforations of the producing well during the period when oil production is occurring.

The methods of this invention utilize polyvalent metal ions extractable from reservoir formations to trigger demulsification of an injected acidified resin composition. The resin barrier can be selectively established by first washing a region of metal ions where no barrier is desired. Thereafter, the injected resin will traverse the washed zone. At the edge of the washed zone, the resin emulsion will encounter and extract metal ions absorbed to the formation. The indigenous polyvalent metal ions then trigger demulsification and coalesence of the resin to create a fluid impermeable barrier.

In accordance with certain aspects of my invention, methods are provided wherein an aqueous acid solution capable of extracting metal ions from a formation matrix is injected into a wellbore and through the formation. The acid solution is effective to extract and remove metal ions, especially ferric and ferrous ions from the formation mineral matrix for some distance remote from the wellbore. The density of the injected acid solution is adjusted to a value greater than the density of oil present in the adjacent formation and greater than the density of the brine in the underlying formation. Preferably the density of the injected fluid is adjusted to a value which is from 5 to 20% greater than the density of brine in the underlying water or brine saturated formation. This is accomplished by adding a water soluble non-ionic solid to the acid solution. Sugars are especially preferred for this purpose, and the especially preferred weighting material is sucrose. Other water soluble non-ionic materials could be used, but because of the low cost and widespread availability of sucrose, it is especially preferred material. After the acid solution wash is completed, an acidified resin emulsion composition is introduced through the wellbore and into the formation. The acidified resin emulsion composition, which comprises an oil soluble, hydrocarbon resin emulsified with an acid stable surfactant, is susceptible to demulsification upon contact with a sufficient concentration of polyvalent metal ions. The density of the injected resin emulsion composition is likewise adjusted to a value greater than the density of the oil in the adjacent formation and greater than the density of the water or brine in the underlying formation. Preferably the density of the resin emulsion is adjusted to a value which is from 5 to 20% greater than the density of the water or brine occupying the formation immediately below the oil saturated interval.

The density adjusted acidified resin emulsion fluid traverses without change through the region previously washed of metal ions. When the resin emulsion reaches the bottom of the washed zone, the acid of the emulsion composition is effective to extract metal ions from the unwashed formation structure of the water rich strata, whereupon the resin emulsion demulsifies and coalesces in the water rich strata or played out zones to form a barrier impermeable to subsequent fluid flow. If the resin emulsion contacts the unwashed oil rich strata in the outer lateral edge of the treated zone, the oil coated formation particles are substantially not effected by acid extraction. Moreover, since the resin is oil soluble, no plugging occurs where a high oil saturation exists even if a sufficient amount of metal ions were extracted to induce demulsification. Because the specific gravity of the injected fluid has been adjusted to a value greater than the specific gravity of both the oil and the brine underlying the oil saturated interval, the fluid migrates in a downward direction because of the influence of gravity, forming a disk or slightly conically shaped, pancake-like barrier. By adjusting the density, the barrier can be made to move downward to a point below the bottom most perforation of the well before the reaction causing the formation of the impermeable barrier initiates.

In a second embodiment of this invention an acidified resin emulsion composition comprising an oil insoluble resin emulsified with an acid stable surfactant is injected after the acid prewash step. The oil insoluble resin demulsifies at the outer edge of the washed zone.

BRIEF DESCRIPTION OF THE DRAWINGS

The attached

FIG. illustrates how a barrier injected into the formation after a water coning situation has arisen by prior art methods which do not recognize the need to control the density of the injected fluid, results in the formation of a barrier to fluid flow which is not effective for the purpose of reducing the flow of water or brine from the underlying water saturated zone into the perforations of the producing oil well.

Figure 4:
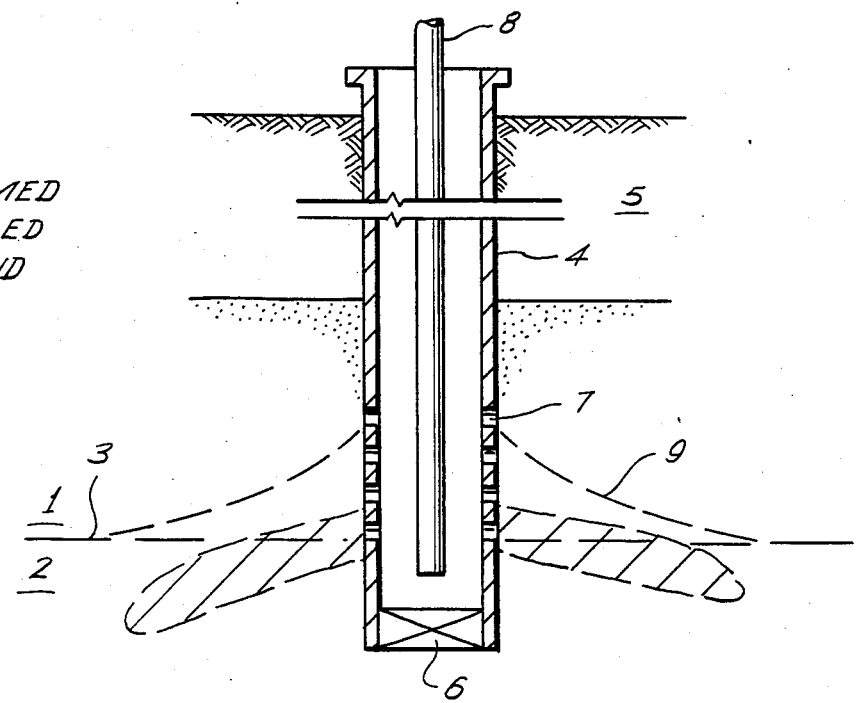

FIG. 4 illustrates how a barrier formed according to the teachings of the present invention, utilizing fluids whose densities are adjusted to a critical value which is slightly greater than the density of the brine occupying the lower permeable formation, forms a barrier which is almost ideally positioned and shaped to greatly reduce or prevent altogether further bottom water coning as fluids are produced from the producing well.

DETAILED DESCRIPTION OF THE PREFERRED EMBODIMENTS

Figure 1:
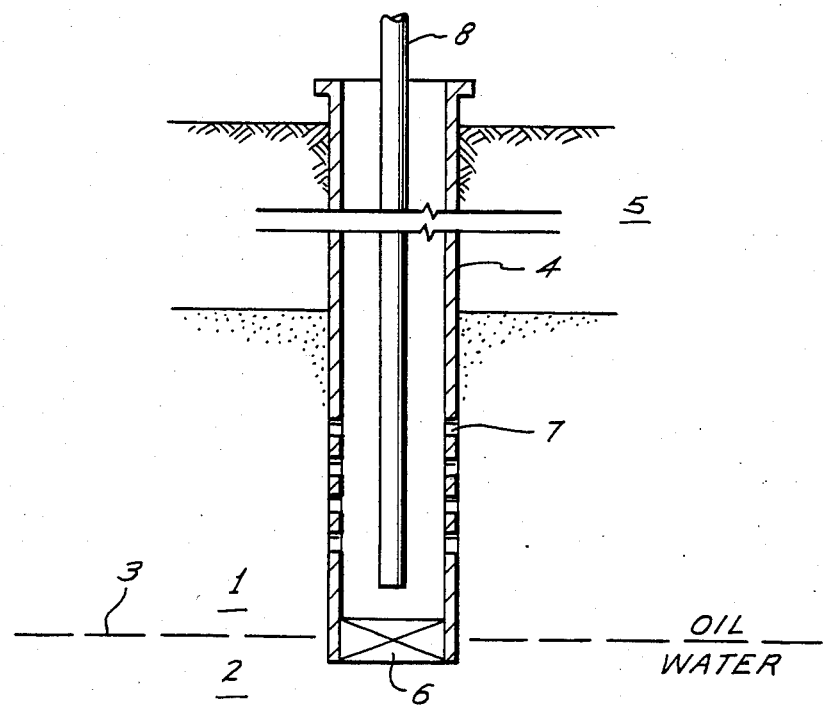
FIG. 1 shows a typical formation containing an oil saturated permeable formation overlying and in immediate contact with a water or brine saturated formation. The producing well is completed to a point near the bottom of the oil saturated interval, and perforations are established only in the oil saturated interval. Prior to production, the oil water interface is essentially horizontal.
Figure 2:
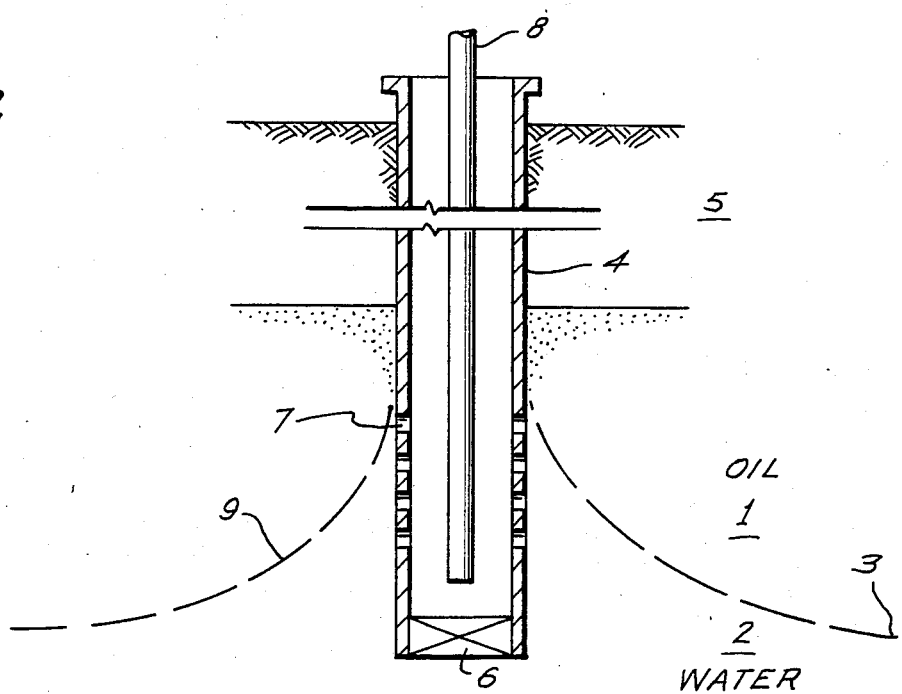
FIG. 2 illustrates how the problem of bottom water coning occurs as fluid is withdrawn from the well by pumping or other means. Although the density of the water or brine is greater than the density of oil, pressure differentials created within the portion of the formation immediately adjacent to the producing well caused the oil-water interface to move upward and water to be drawn into the perforations. Passage of water through the cone shaped volume of formation near the perforations desaturates that portion of the formation of oil and increases the permeability, which ensures that the water cone configuration will be maintained as long as the production phase continues, and that it will reform quickly even after pumping has been terminated for a period of time sufficient to allow the cone to subside back to a level closer to that existing prior to the production phase.

This invention will be described with reference to particularly preferred embodiments which constitute the best mode known to the inventor at the time of this application. The type of formation in which the problem for which the present invention is intended as a cure is best understood by referring to FIG. 1, in which there is an oil containing formation 1 which is a permeable formation with at least a substantial portion of the formation pore spaces formation occupied by a fluid which is predominately liquid petroleum or oil. This particular formation overlies a similarly permeable formation 2 the pore spaces of which are saturated with an oil field brine or water. There is no impermeable barrier between the oil saturated interval 1 and the water saturated interval 2, and the oil water interface 3 which has stabilized over geologic periods of time exist only because of the difference in density between the petroleum fluid occupying the pore spaces in the upper portion of the formation and the higher density water or brine occupying the pore spaces in the lower portion of the formation. Producing well 4 penetrates through the overburden 5 to a point near the bottom of the oil saturated interval 1. The lower portion of the casing is closed off by a plug 6 and perforations 7 are established in the well casing in order to permit the flow of fluids from the oil-saturated formation into the interior of the well casing. A producing tubing 8 is located within the well casing, which may simply permit flow of petroleum to the surface of the earth as a result of natural, or a pump (not shown in the drawing) may be necessary in order to transport the oil to the surface of the earth. FIG. 1 illustrates the situation as it would exist prior to the initiation of production of oil from the formation. As oil is produced from the formation, a zone of reduced pressure is created around the perforations. This reduced pressure induces oil to flow into this zone horizontally from the more remote portions of oil saturated intervals, which is beneficial to the oil production operation. Unfortunately, the same reduction in pressure causes water or brine to begin moving upward from the previously water saturated zone 2 until they reach the lower perforations of the producing well. Continued pumping and production of fluids can cause the oil water-interface 9 which defines the upper boundary of the cone created by the pressure differential imposed on the formation by the pumping operation to reach essentially to the top of the perforations 7 as shown in FIG. 2. In this extreme case of water coning, the fluid being recovered from the well would be essentially all water or brine and would contain very little oil.

One simple solution to water coning is to cease pumping fluid from the well, thereby allowing the oil water interface to reform to the equilibrium state it originally occupied as is shown in FIG. 1. Unfortunately, long periods of time are required for this condition to occur. Moreover, the passage of water through the cone area adjacent to perforations decreases the oil saturation in that portion of the formation, increasing the permeability in the portion of the formation within the cone which makes it possible for the cone to reform much more quickly after oil production operations are later resumed than was originally the case.

Figure 3:
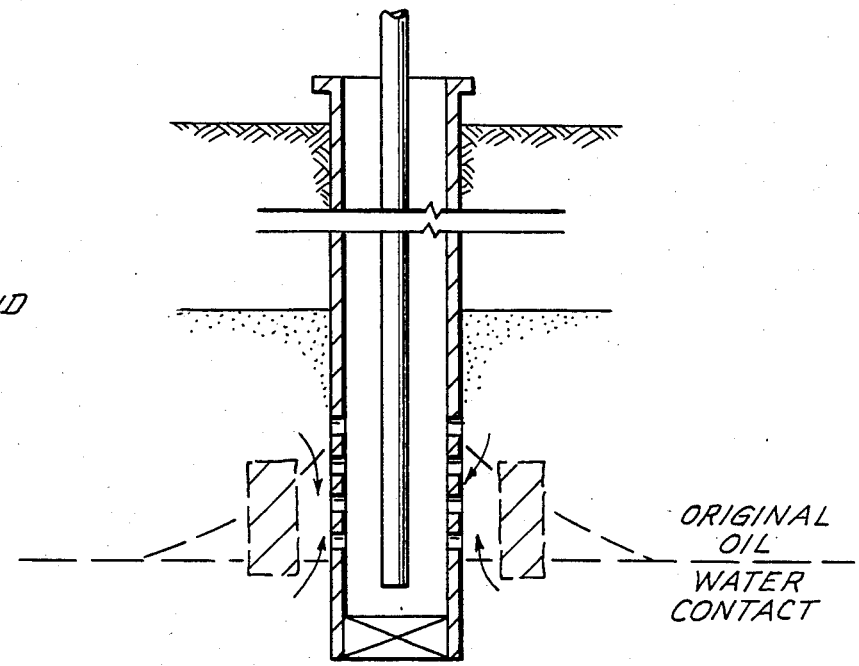

There are many processes described in the literature for producing fluid impermeable barriers in the formation for the purpose of reducing the flow of water into oil wells. Simply introducing a barrier forming material into the formation through the perforations would effectively close off the well and prevent further production of any kind of fluids therefrom, which would of course be unsatisfactory as a means of inducing resumption of petroleum from the well. Certain prior art methods teach a means by which the barrier may be caused to be formed at a distance away from the wellbore, which is excellent for reducing the flow of water from water saturated intervals that are interspersed with oil saturated intervals. As can be seen in FIG. 3, however, such a barrier located essentially horizontally adjacent to but removed from perforations in the well would not prevent the flow of water from the lower water saturated interval in this case, and so would not provide a satisfactory solution to the water coning problem.

I have discovered, and this constitutes my invention, that it is possible to form a impermeable barrier which is induced to move downward into the formation so it is formed below the bottom perforations of the producing well, which will restrain the upward movement of water or brine from the lower formation, while permitting the free flow of oil laterally into the perforation from the oil saturated interval. This is illustrated in FIG. 4, where a disk or cone-shaped barrier is formed adjacent to the producing well at a point below the level where the fluids utilized to form the barrier are introduced into the formation.

The treating fluid utilized is essentially that described in my U.S. Pat. No. 4,475,593, with the difference being that all fluids introduced into the formation either as a pretreatment or as the barrier forming constituent, have their densities adjusted to a very critical value relative to the densities of the fluids present in the formation penetrated by the well. The density of all of the fluids must be adjusted to a value greater than the density of the oil or petroleum portion of the formation, and further must be slightly greater than the density of the water or brine underlying the oil saturated interval. The density adjustment is accomplished by adding to all fluids to be injected into the formation, a sufficient amount of non-ionic solid which is soluble in the fluids. Sugars are especially suitable for this purpose, and the especially preferred material is sucrose. Any non-ionic material soluble in the injected fluids can be used, but sugars in general and sucrose in particular are especially preferred because of their low cost and widespread availability.

The following describes the treating fluids utilized, which are essentially the same as those described in my U.S. Pat. No. 4,475,593, but it is repeated here for purpose of complete disclosure.

Further in accordance with this invention a dilute aqueous acid solution is provided. The acid selected is typically a mineral acid such as HCl, $H_3PO_4$, $H_2NSO_3H$ or $H_2SO_4$ which provides a relatively low pH at dilute concentration. Moreover, such mineral acids are relatively inexpensive and readily available. A drawback to the use of mineral acids, however, is their corrosive nature. However, this invention is not confined to any particular acid constituency. For example, organic acids such as acetic acid are also suitable for use in the methods of this invention although typically such acids are more expensive than HCl. The acidity of the solution is selected to be sufficient to extract and solvate available polyvalent metal ions especially ferric and ferrous ions adsorbed to the formation structure. Generally, an acid solution having a pH of somewhat over 3 is preferred. Such an acid strength is effective to remove a substantial amount of extractable metal ions for a desired volume of formation.

Further in accordance with the methods of this invention, the acid solution is injected through a selected borehole and pushed outward through the formation as a result of injection pressure, while at the same time the acid fluid moves downward because it's density exceeds the density of the formation fluids, thereby effecting a washed zone. As the acid traverses the formation it extracts the metal ions contained by the formation structure. Moreover, as the acid solution advances, it will solvate and remove the metal ions from the formation. In general, Applicant has shown that a two pore volume of acid solution is effective to wash a desired volume of formation. It will be recognized by practitioners of this invention that various factors such as volume of acid solution, acid strength, rate of injection, formation permeability, temperature conditions and metal ion concentration will affect the extent of the washed zone.

Following the acid wash step, a volume of acidified resin emulsion is injected into the well and pushed through the formation. The acid stable resin emulsion comprises either an oil insoluble or an oil soluble, hydrocarbon resin, emulsified within an acid stable surfactant in an aqueous acid media with sufficient sucrose or other sugar added to raise the fluid density to the desired value. Further, the resin emulsion selected is one which is subject to demulsification upon exposure to a sufficient concentration of polyvalent metal ions, typically ferric or ferrous ions.

The resins used herein are relatively high melting point hydrocarbons. In practice, resins are actually mixtures of hydrocarbon materials and consequently do not have a sharp melting point. Typically as temperature increases a resin goes from solid to tacky semisolid to liquid. Resins are often characterized by their softening point, which corresponds to the temperature midway through the semisolid stage. As will be appreciated by those skilled in the art, a resin selected for the methods of this invention should necessarily have a softening point near that of the formation temperature or fluid flow conditions. If the softening point is too low, there will be little viscosity to maintain a barrier at high temperatures. On the other hand if the resin selected has a softening point which is significantly higher than formation conditions, then demulsification of the resin results in granular particles too small and too hard to coalesce.

Resins are available in a large range of softening points. In addition, many materials not generally used as resins, such as asphaltenes for example, could serve as resins for use in the process of this invention.

A resin emulsion is a resin which has been emulsified into an internal phase of resin particles on the order of micron size and an external water phase by use of a surfactant. Necessarily, it will be recognized in the context of this invention that the surfactant used should be stable to acid. On a commercial level only a few such resin emulsions are currently available. Most of these however have relatively low softening points. As a result, Applicant has found it advantageous to custom formulize the resin emulsion, which will be described in more detail in the examples.

After the resin emulsion has been prepared, it can be acidified to a desired acid range pH, or suitably buffered in the pH range from about 1.5 to 3.5. Applicant has observed that varying the acid strength often determines the lateral extent of the plug established. Buffering agents desirable for purposes of this invention include phosphoric acid and sulfamic acid buffer systems. Where no insoluble phosphates will be formed, phosphoric acid is preferable because it is cheaper, while in formations having ions which will form insoluble phosphates and phosphoric acid, sulfamic acid buffer systems are desirable.

Next this acidified resin composition is injected into the wellbore and forced through the formation. The acidifed resin fluid moves laterally outward because and so long as injection pressure exceeds formation pressure. The acidified resin fluid moves downward into the formation because it's density exceeds the formation fluid density. As the resin emulsion composition traverses that region previously washed by the acid solution, no metal ions are available for extraction. Consequently, the resin emulsion traverses unchanged. When the acidified resin emulsion reaches the outer edge of the washed zone some distance from the wellbore, the acidified resin is effective to extract and solvate the metal ions. The extracted polyvalent metal ions cause the resin particles to coalesce and demulsify from the emulsion. The coalesced resin droplets effectively plug the pore spaces of the water rich formation structure or played out zones thereby creating a barrier to subsequent fluid flow. The barrier is established over a relatively large distance, somewhat flat and extending outward from the wellbore due to the combined effects of injection pressure and fluid density.

Further it should be apparent that if the resin emulsion, which comprise an oil soluble resin, contacts an oil rich region no plugging occurs even if extractable metal ions are present. In situations where the resin emulsion comprises an oil insoluble resin, the relative oil, water solubilities of resin will cause the resin to preferentially coalesce in the water rich strata as opposed to the oil rich strata.

To further illustrate the invention several laboratory experiments have been performed by the Applicant. The examples which follow, should not be considered as limiting the invention but rather only as exemplary of the various embodiments based on those laboratory results.

The resin emulsion utilized in the plugging experiments was prepared as follows. Picconol AA101 a 50% solid aqueous emulsion was obtained from Hercules, Inc., Wilmington, Del. Picconol AA101 is a proprietary product of Hercules, Inc. comprising neutral synthetic hydrocarbon resins derived from a variety of aliphatic aromatic, and terpene monomeric and other low molecular weight hydrocarbons. Also included in the resin emulsion is an anionic, acid stable surfactant which is about 6% of the resin by weight. The resin emulsion is further characterized in that it has a softening point of about 160° F. (71° C.), pH 4.5, 1 micron particle size, 0.98 specific gravity, surface tension of 29 dynes/cm, viscosity of 60 cps at 25° C., a viscosity of less than 1 cp at steam temperature, and intolerant to polyvalent metal ions such as iron, calcium and aluminum.

According to this invention Picconol AA101 was diluted to a 5% solid emulsion using a 0.27 M phosphoric acid/0.045 M $Na_2HPO_4$ buffer, such that the pH of the resulting emulsion was 1.75.

On request, Hercules, Inc. was able to supply Applicant with resin emulsion compositions similar to Picconol AA101 but with higher softening points. Both a 95° C. and 100° C. softening point resin emulsified identical to Picconol AA101 were provided.

EXAMPLE I

Displacement and plugging experiments were run in $2\frac{1}{4} \times 18$ inch stainless steel tubes packed with Kern River sand which had been solvent cleaned. The cleaning was necessary for two reasons. First, the acid cannot extract ions from oil covered rock; and second the resin itself is oil soluble and will not effect plugging where a high oil saturation exists. The initial packing of tubes with formation material exhibited a permeability of 12 to 15 darcies.

The tube was heated to 150° F. to simulate formation temperature. Next the buffered resin emulsion (160° F. softening point) described above was introduced to the tube. After three pore volumes of resin emulsion were passed through the tube a considerable pressure developed across the tube. No resin emerged from the tube and permeability subsequently measured was 7.48 md, less than 0.1% of the original pack.

EXAMPLE II

A no plug experiment was run demonstrating the use of an acid wash to prevent subsequent resin plugging.

A column with Kern River formation sand was placed in the oven (which was maintained at 150° F.). As previously, the tube had been evacuated and charged with water prior to introduction of the resin. Two pore volumes of 2N HCl were injected. By the end of the first pore volume, the effluent had the characteristic green color of ferrous ion. This color continued through most of the 200 mL (equivalent of 1 pore volume) water buffer which followed.

Resin emulsion Picconol AA101 at 5% containing 0.27 M $H_3PO_4$ and 0.045 M $Na_2HPO_4$ was injected. After about 1 pore volume the resin emulsion began to be produced, visually identical with the injection material. In the no plug run, resin emerged unchanged and pressure did not increase as long as the run continued (about 1 pore volume beyond first resin production).

For the purpose of further illustrating the operability of the process of my invention performing a low permeability or impermeable barrier under various conditions, and the range of embodiments contemplated within my invention, reference is made to Examples II through IV and VI through XIII of my U.S. Pat. No. 4,475,593, all of which are incorporated herein by reference.

For the purpose of further illustrating the best mode of applying his invention, Applicant hereby supplies the following pilot field example. A producing well is drilled into a subterranean petroleum-containing formation which is 60 feet thick which underlies a high permeability sand saturated with a 10% oil field brine. The permeability of the formation is 250 milidarcies and the porosity is 30%. The producing well is drilled to a level just above the bottom of the oil saturated interval and a plug set at the bottom of the well casing. Perforations are formed over about the middle half of the oil producing interval. A producing tubing and a downhole pump are installed in the well and production is begun from the well. Although the well is initially a good producer, after about six months, the water oil ratio of the fluid being produced begins rising and after approximately one year of operation, the water content of the produced fluid is approaching 100% and the amount of oil being recovered from the well is so low that continued operation of the well appears to be unjustified. It is determined that the cause of the problem is bottom water coning similar to the situation shown in FIG. 2, and it is estimated that the cone has risen approximately 30 feet from the bottom of the original oil water interface and that the radius of the cone is approximately 60 feet. It was decided to treat the well in hopes of forming a barrier below the lower perforations of the producing well extending radially outward and ideally oriented concically downward in order to deter flow of water from the underlying aquifer and to the perforations of the well when production of fluids from the well resumes. It is hoped to form a barrier approximately 10 feet thick and extending radially outward a total of 60 feet. This would require the placement of a barrier having a total volume of $$\pi(60)^2(10) = 113,101 \text{ cu. ft.}$$

Since the porosity of the formation is known to be 30%, then the volume of treating material necessary to form this barrier in the desired location would be 0.3 × 113,101 or 33,930 cu.ft. This requires 253,833 gallons of each treating fluid.

The following briefly outlines the fluids prepared in the sequence of injecting the fluids in order to form the barrier according to the process of my invention. First, an acid solution must be formulated to be injected into the formation for the purpose of extracting metal ions from the formation matrix to avoid having the subsequently injected resin formulation react prematurely. For this purpose, approximately 253,833 gallons of a ½% sulfamic acid solution is prepared. Since it is desired that the fluids injected into the formation move outward into the cone shaped zone through which water is flowing and simultaneously move downward into the water saturated zone, the density of all injected fluids should be adjusted to a value which is at least 5% greater than the density of the brine underlying the oil formation. It is determined that the density of the oil field brine underlying this formation is approximately 1.03. Sufficient weighting material must be added to each fluid injected into the formation to ensure that its density is at least 1.05 × 1.03 or about 1.08. It is determined that sucrose is readily available in the area at an attractive price, and approximately 457,000 pounds of sucrose are dissolved in the acid solution in order to increase its density to the desired level prior to injecting it into the formation. This quantity of acid is injected into the formation at a rate of about 125,000 gallons per day. The injection rate should be controlled carefully in order to ensure that the downward movement of the weighted fluid is not overshadowed by the dynamic effect of rapid injection of the fluid into the formation adjacent to the producing well.

A suitable acidified resin emulsion composition is formulated for the purpose of actually forming the impermeable barrier. The resin chosen for this application is Picconol AA101 diluted to a 5% solid emulsion using 0.27 M phosphoric acid/0.045 M $Na_2HPO_4$ buffer, such that the pH resulting emulsion was 1.75. To 254,000 gallons of this fluid was added approximately 457,000 pounds of sucrose to increase the density of the buffered resin solution to a value of about 1.08, which is necessary to ensure that the resin fluid moves slowly downward in the formation after its injection thereunto as a result of its density being greater than the density of the underlying brine. This quantity of resin was then injected into the formation at a controlled rate of approximately 125,000 gallons per 24 hour period. In order to ensure that the resin is displaced from the cone shaped zone immediately adjacent to the perforations, where it is desired that the barrier not be formed, a quantity of brine or water should be injected to occupy the approximate volume of the cone previously formed by the water coning phenomena. For this purpose, a 5% brine solution was injected into the perforations at a rate of 125,000 gallons for 24-hour period. The volume necessary to fill the cone shaped zone is $$\tfrac{1}{3}\pi(R)^2 H \text{ (porosity) or}$$

$$(0.33)(\pi)(60^2)(30)(00.3) = 33,591 \text{ cu. ft.}$$

which is equivalent to 251,294 gallons of brine. Again, this fluid is injected at a controlled rate to ensure that it does not override the gravity effect and displace the previously injected resin material away from the well. The desired displacement fluid is injected at a rate of about 125,000 gallons per 24 hour period. The well is then shut in for a soak period sufficient to ensure that the resin formulation has completely reacted and hardened, which requires approximately 0.2 days. The well is thereafter put back on pump, and production of oil with relatively little water is obtained, indicating the water cone problem has been alleviate by the above described treatment.

Although my invention has been described in terms of numerous embodiments which Applicant believes to represent the preferred embodiments and to include the best modes of applying the process of his invention known at the time of making this application, it is recognized to persons skilled in the art that various modifications may be made to the composition and procedures followed as described in the specification without departing from the true spirit and scope of the invention which are defined in the claims appended immediately hereinafter below.

What is claimed is:

1. A method of treating a producing oil well completed in an oil containing formation overlying and in contact with a formation water containing an aqueous fluid, said well having communication means with at least a portion of the oil formation, to form a water impermeable barrier below the communication means of said well to prevent aqueous fluid moving upward from the underlying aqueous fluid containing formation into the well which comprises the steps of:

determining the specific gravity of the aqueous fluid occupying the permeable formation underlying the oil formation;

forming an acid solution capable of extracting metal ions from the formation structure, having dissolved therein sufficient nonionic soluble solids to raise the density of the acid solution to a value greater than the density of the aqueous fluid in the underlying formation;

injecting said weighted acid solution through the well into the formation;

forming an acidified resin emulsion composition comprising a hydrocarbon resin, acidified water and acid stable surfactant, which resin emulsion is susceptible to demulsification on contact with a sufficient concentration of polyvalent metal ions, and also containing an amount of soluble nonionic solid material sufficient to raise the density of the acidified resin emulsion composition to a value greater than the density of the aqueous fluid in the underlying formation; and introducing said acidified resin emulsion composition through the well into the formation at a predetermined injection rate, whereupon the resin emulsion demulsifies in a region of the formation below the perforations of the wellbore, said region containing extractable polyvalent metal ions, said demulsification being effected to establish a barrier having greatly reduced permeability to fluid flow over a relatively long period of time.

2. A method as recited in claim 1 comprising the additional step of introducing a fluid into the formation subsequent to injecting the resin formulation in an amount sufficient to occupy at least a substantial portion of the zone in which the water coning has occurred in the portion of the formation adjacent to the wellbore.

3. A method as recited in claim 2 wherein the fluid is an aqueous fluid.

4. A method as recited in claim 1 wherein the formation contains extractable ferric or ferrous ions.

5. A method as recited in claim 1 wherein the aqueous acid solution is an organic acid or a dilute mineral acid.

6. A method as recited in claim 1 wherein the aqueous acid solution is a dilute hydrochloric acid solution, phosphoric acid solution, sulfamic acid solution, sulfuric acid solution or acetic acid, or mixtures thereof.

7. A method as recited in claim 1 wherein the hydrocarbon resin is oil soluble.

8. A method as recited in claim 1 wherein the hydrocarbon resin is oil insoluble.

9. A method as recited in claim 1 wherein the resin emulsion comprises from about $\frac{1}{8}\%$ to about 5% resin solids and anionic acid stable surfactant emulsified in an aqueous acid buffer solution.

10. A method as recited in claim 1 wherein the resin emulsion composition composition is buffered to a pH in the range of from about 1.5 to about 3.5.

11. A method as recited in claim 1 wherein the fluid added to the aqueous acid solution to increase its density is a sugar.

12. A method as recited in claim 11 wherein the sugar is sucrose.

13. A method as recited in claim 1 wherein the density of the acid solution is from 1.01 to 1.05% greater than the density of the aqueous fluid in the formation underlying the oil containing formation.

14. A method as recited in claim 1 wherein the fluid added to the aqueous acid solution to increase its density is a sugar.

15. A method as recited in claim 14 wherein the sugar is sucrose.

16. A method as recited in claim 1 wherein the density of the acid solution is from 1.01 to 1.05% greater than the density of the aqueous fluid in the formation underlying the oil containing formation.

* * * * *